(12) United States Patent
Kitawaki et al.

(10) Patent No.: US 8,203,962 B2
(45) Date of Patent: Jun. 19, 2012

(54) NETWORK MONITORING DEVICE, NETWORK MONITORING METHOD, AND NETWORK MONITORING PROGRAM

(75) Inventors: Jun Kitawaki, Kawasaki (JP); Kiminori Sugauchi, Yokohama (JP); Emiko Kobayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 12/486,419

(22) Filed: Jun. 17, 2009

(65) Prior Publication Data
US 2010/0061257 A1   Mar. 11, 2010

(30) Foreign Application Priority Data
Sep. 8, 2008   (JP) ................................ 2008-229387

(51) Int. Cl.
| | |
|---|---|
| G01R 31/08 | (2006.01) |
| H04W 4/00 | (2009.01) |
| H04L 12/66 | (2006.01) |
| H04L 12/28 | (2006.01) |

(52) U.S. Cl. ........ 370/252; 370/328; 370/353; 370/356; 370/389; 370/392

(58) Field of Classification Search .......... 370/351–356, 370/389–392, 400
See application file for complete search history.

(56) References Cited

U.S. PATENT DOCUMENTS

| | | | | |
|---|---|---|---|---|
| 2004/0125795 | A1* | 7/2004 | Corson et al. ................. | 370/356 |
| 2006/0023719 | A1* | 2/2006 | Sindhu et al. ................. | 370/392 |
| 2008/0253359 | A1* | 10/2008 | Furukawa et al. ............ | 370/352 |
| 2008/0310340 | A1* | 12/2008 | Isozu ........................... | 370/328 |

FOREIGN PATENT DOCUMENTS
JP    2002-368750    12/2002

* cited by examiner

Primary Examiner — Brandon Renner
(74) Attorney, Agent, or Firm — Brundidce & Stancer, P.C.

(57) ABSTRACT

Information on a communication relation or communication path to be monitored is automatically generated to reduce load of a user. A path information generation part receives a destination IP address designated by a user, through an input receiving part. When the input of the destination IP address is received, the path information generation part uses configuration information tables, each of which stores configuration information of a device on a network, to identify IP addresses of networks each having a plurality of terminals, as branch IP addresses. The path information generation part uses the configuration information tables and transfer destination information tables each storing a routing table of a router, to identify the connection order of routers between the designated destination IP address and the identified branch IP addresses, to generate path information.

2 Claims, 14 Drawing Sheets

FIG. 3

CONFIGURATION INFORMATION
TABLE 220

| DEVICE ID | 01 |
|---|---|
| DEVICE NAME | R-a |
| MANAGEMENT IP ADDRESS | *** |
| INTERFACE INFORMATION | |

| INTERFACE ID | INTERFACE NAME | IP ADDRESS | SUBNET MASK |
|---|---|---|---|
| 01 | if1 | *** | *** |
| 02 | if2 | *** | *** |
| 03 | if3 | *** | *** |
| ⋮ | ⋮ | ⋮ | ⋮ |

221 DEVICE ID
222 DEVICE NAME
223 MANAGEMENT IP ADDRESS
224 INTERFACE INFORMATION
ENTRY
225 / 226 / 227 / 228

FIG. 4

TRANSFER DESTINATION INFORMATION TABLE 230

| DEVICE ID | 01 |
|---|---|
| TRANSFER DESTINATION INFORMATION | |

| DESTINATION IP ADDRESS | INTERFACE ID | NEXT HOP | TRANSFER TYPE | SUBNET MASK |
|---|---|---|---|---|
| 192.168.1.0 | 02 | *** | DIRECT | 255.255.255.0 |
| 10.10.10.0 | 03 | 192.168.100.1 | *** | 255.255.255.0 |
| 0.0.0.0 | 04 | 192.168.200.1 | *** | 0.0.0.0 |
| ⋮ | ⋮ | ⋮ | ⋮ | ⋮ |

ENTRY 233  234  235  236  237

FIG. 5

PATH INFORMATION TABLE 240

| | DESTINATION IP ADDRESS | 192.168.0.0/24 |
|---|---|---|
| 241 | DESTINATION IP ADDRESS | 192.168.0.0/24 |
| 242 | BRANCH IP ADDRESS | 10.0.0.0/24 |
| 243 | PATH INFORMATION | |

| | DEVICE ID | INTERFACE ID |
|---|---|---|
| ENTRY | 01 | 01 |
| | 02 | 02 |
| | 03 | 03 |
| | 04 | 04 |
| | ⋮ | ⋮ |
| | 244 | 245 |

FIG. 6

TRAFFIC INFORMATION TABLE 250

| COLLECTION TIME | 2008/1/10 00:02:00 |
|---|---|
| DEVICE ID | 01 |

TRAFFIC INFORMATION

| INTERFACE ID | CUMULATIVE INPUT TRAFFIC | INPUT TRAFFIC | CUMULATIVE OUTPUT TRAFFIC | OUTPUT TRAFFIC |
|---|---|---|---|---|
| 01 | 3600 | 1200 | 7800 | 500 |
| 02 | *** | *** | *** | *** |
| 03 | *** | *** | *** | *** |
| 04 | *** | *** | *** | *** |
| ⋮ | ⋮ | ⋮ | ⋮ | ⋮ |

FIG. 10

PATH DISPLAY SCREEN 900a

| | | | | |
|---|---|---|---|---|
| 910 { DESTINATION INFORMATION | BRANCH A | 192.168.1.0/24 | | |
| 920 { PATH INFORMATION | DEVICE NAME: INTERFACE ID | IP ADDRESS | INPUT TRAFFIC | OUTPUT TRAFFIC |
| | R-a:01 | 192.168.1.1 | 200 | 165 |
| | R-d:02 | 200.1.1.2 | 100 | 70 |
| | R-e:03 | 100.1.1.3 | 120 | 68 |
| | R-f:04 | 10.10.10.4 | 60 | 44 |
| 930 { BRANCH INFORMATION | BRANCH D | 192.16812.0/24 | | |

FIG. 12

PATH DISPLAY SCREEN 900b

| | | | | |
|---|---|---|---|---|
| DESTINATION INFORMATION | BRANCH A | 192.168.1.0/24 | | |
| PATH INFORMATION | DEVICE NAME: INTERFACE ID | IP ADDRESS | INPUT TRAFFIC | OUTPUT TRAFFIC |
| | R-a:01 | 192.168.1.1 | 200 | 165 |
| | R-d:02 | 200.1.1.2 | 100 | 70 |
| | R-e:03 | 100.1.1.3 | 120 | 68 |
| BRANCH INFORMATION | BRANCH D | 192.16812.0/24 | | |
| | BRANCH E | 192.16813.0/24 | | |

FIG. 14

PATH DISPLAY SCREEN 900c

| | | 921 | 911 | 922 | 912 | 923 | 924 |

| | | |
|---|---|---|
| 910 { | DESTINATION INFORMATION | DESTINATION A | 192.168.1.0/24 |

| | | DEVICE NAME: INTERFACE ID | IP ADDRESS | INPUT TRAFFIC | OUTPUT TRAFFIC |
|---|---|---|---|---|---|
| 920 { | PATH INFORMATION | R-a:01 | 192.168.1.1 | 200 | 165 |
| | | R-d:02 | 200.1.1.2 | 100 | 70 |
| | | R-e:03 | 100.1.1.3 | 120 | 68 |
| | | R-f:04 | 10.10.10.4 | 60 | 44 |
| 930 { | BRANCH INFORMATION | BRANCH D | 192.16812.0/24 |
| | | BRANCH E | 192.16813.0/24 |

931      932

NETWORK MONITORING DEVICE, NETWORK MONITORING METHOD, AND NETWORK MONITORING PROGRAM

BACKGROUND OF THE INVENTION

The present invention relates to a network monitoring device, a network monitoring method and a network monitoring program for monitoring a state of a communication network.

Recently, to assure quality of services provided through a network, the need to monitor the state of the network so as to manage the performance and quality of the network is increasing.

For example, as a method of monitoring a network, there is one in which a dedicated device for collecting communication data is placed at a specific point on a network and all the data passing through the dedicated device are collected and analyzed.

As another method, there is for example a method in which statistical information concerning communication is collected from network devices (such as switches and routers, for example) on a network and then the collected statistical information is analyzed.

Further, there is a technique that uses information collected from a dedicated device or network devices such as ones described above, and analyzes paths or points on a network to be monitored in detail.

For example, Japanese Un-examined Patent Application Laid-Open No. 2002-368750 discloses a network analysis device that receives a message of a Service Level Agreement (SLA) evaluation result from an SLA evaluation device, and identifies network devices on a path that does not satisfy the SLA. Then, the network analysis device notifies a user that it is highly necessary to monitor the identified network devices.

SUMMARY OF THE INVENTION

According to such a technique as described above, it is necessary that the network administrator grasps all communications as targets of the SLA evaluation and registers such communications in the SLA evaluation device in advance. In other words, the network administrator should grasp for example a combination of a starting point and an ending point for each communication relation as a target of the SLA evaluation, and register that information in the SLA evaluation device.

However, the larger the scale of a monitored network becomes, the larger the number of communication relations and the number of communication paths of the network become.

Thus, it is a heavy burden for a user such as the network administrator to grasp the communication relations and the communication paths on a network to be monitored, and to register those relations and paths one by one into a device used for analyzing the network.

Thus, an object of the present invention is to provide a technique of automatic generation of information on communication relations and communication paths to be monitored, to reduce the burden of a user.

To solve the above problem, a first mode of the present invention provides a network monitoring device that monitors a state of a network having a plurality of terminals and network devices, comprising:

a storage part, which stores: configuration information that includes interface address information for each of the terminals and the network devices; and transfer destination information held by each of the network devices, the transfer destination information including information that associates destination address information with transfer destination address information to which the destination address is to be transferred;

an input receiving part, which receives, through an input part, designated destination address information as an object of path information generation; and a path information generation part, which performs:

processing in which, from the transfer destination information of each network devices and for each piece of destination address information, a network address of the destination address is acquired as a first address, then, from the configuration information of each of the terminal, a network address of the interface address is acquired as a second address, and then, among the first addresses, each address that coincides with a plurality of the second addresses is acquired as a branch network address;

processing in which, from the configuration information of each of the network devices, a network address of the interface address is acquired as a third address, then, among the third addresses, an address coincident with the branch network address is identified, and then, a network device having the interface corresponding to the address in question is identified; and processing in which, by sequentially and repeatedly performing: first processing in which, from the transfer destination information of the identified network device, a transfer destination address to which the designated address should be transferred is acquired; and second processing in which, from the configuration information of each of the network devices, an interface address coincident with the acquired transfer destination address is identified, and a network device having the identified interface address is identified, to use then the transfer destination information of the identified network device in the first processing, path information that includes connection order of network devices between a branch network and the designated designation address is generated and the generated path information is stored in the storage part.

According to the present invention, information on a communication relation or communication path to be monitored is automatically generated, and user's load is reduced.

BRIEF DESCRIPTION OF THE DRAWINGS

FIG. 3 is a diagram showing an example of construction of a configuration information table;

FIG. 4 is a diagram showing an example of construction of a transfer destination information table;

FIG. 5 is a diagram showing an example of construction of a path information table;

FIG. 6 is a diagram showing an example of construction of a traffic information table;

FIG. 10 is a view showing an example of display of path information between a destination and a branch;

FIG. 12 is a view showing an example of display of common path information between a destination and a plurality of branches;

FIG. 14 is a view showing an example where common path information between a destination and a plurality of branches and added path information are displayed.

DETAILED DESCRIPTION OF THE EMBODIMENTS

Figure 1:
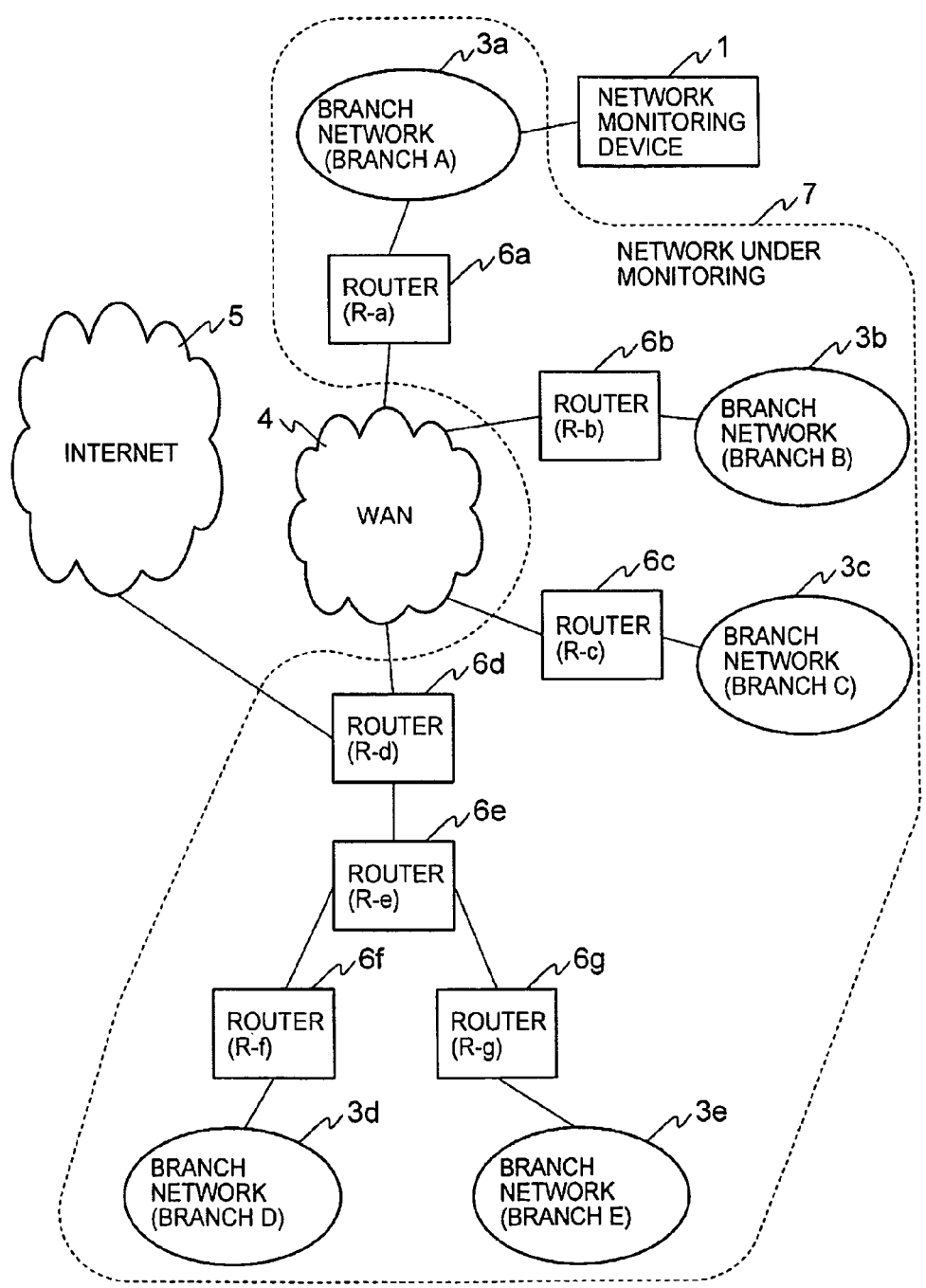
FIG. 1 is a diagram showing an example of a configuration of a network to which a network monitoring device of a first embodiment is coupled.

Now, a first embodiment of the present invention will be described referring to the drawings.

FIG. 1 is a diagram showing an example of configuration of a network to which a network monitoring device according to the first embodiment is coupled.

As shown in the figure, the network 7 is coupled to a Wide Area Network (WAN) 4 and the Internet 5. The network 7 is coupled with the network monitoring device 1.

The network 7 is a network as the object of monitoring by the network monitoring device 1. For example, the network 7 is a network of an organization such as a company.

The WAN 4 is a dedicated line network provided by a communication carrier. The communication carrier uses the WAN 4 to provide dedicated line communication service to organizations such as companies.

The network 7 comprises branch networks 3*a*-3*e* and routers 6*a*-6*g*.

In the following, sometimes the branch networks 3*a*-3*e* or the routers 6*a*-6*g* are expressed simply as "branch networks 3" or "routers 6" in the case where each does not need to be discriminated.

The branch networks 3 are coupled with each other through routers 6 and the WAN 4, or through routers 6. Each branch network 3 is a network such as a LAN and is provided with a plurality of terminals such as PCs, workstations and servers.

A terminal on a branch network 3 can access other branch networks 3 and the Internet 5 through routers 6 and the WAN 4, to receive provision of various services.

A branch network 3 may include, for example, a data center that provides various kinds of service. A data center is provided with various servers such as a WEB server, a DNS server, a file server, for example. Using various servers, a data center provides various services to terminals on the branch networks 3.

Each router 6 is a network device that transfers packet data by using a routing table or the like. A router 6 is provided with a plurality of communication interfaces, to be coupled to a plurality of networks. Further, a router 6 has a routing table used for transferring received packet data and a table for storing counted communication traffic of the plurality of communication interfaces.

Further, a router 6 has a function of a Simple Network Management Protocol (SNMP) agent, for example. An SNMP agent can communicate with an SNMP manager of an external device and provide routing information, information on traffic (traffic information), and the like to the external device.

The network monitoring device 1 monitors the network 7. For example, the network monitoring device 1 performs generation of path information, collection of traffic information, display of the path information, display of the traffic information, and the like concerning the network 7. Although the network monitoring device 1 is coupled to the branch network 3*a* in the case shown in FIG. 1, it may be coupled to another branch network 3*b*-3*e* or a router 6*a*-6*g*.

Of course, the network configuration is not limited to that described above. For example, in addition to the network monitoring device 1, the network 7 may be coupled with a network management device that performs control, management and the like of the organization's network system as a whole.

Here, for example, it is assumed that a data center is constructed in the branch network 3*a*. In that case, the data center provides various services to terminals, and thus it may cause traffic concentration on the paths between the branch network 3*a* and the branch networks 3*b*-3*e*.

In particular, if traffic concentrates on the paths between the branch networks 3*b*-3*e* and the branch network 3*a*, then the WAN 4 or the path between the WAN 4 and the branch network 3*a* becomes a bottleneck, and the performance or the quality of the network 7 as a whole is deteriorated. Further, the quality of the services provided by the data center may be deteriorated.

Thus, when the network monitoring device 1 is used to monitor traffic between the branch networks 3*b*-3*e* and the network 3*a*, a user such as the network administrator can grasp and improve the performance, quality and the like of the network 7.

In the following, the description will be continued assuming that a data center is constructed in the branch network 3*a*.

Next, a configuration of the network monitoring device 1 will be described.

Figure 2:
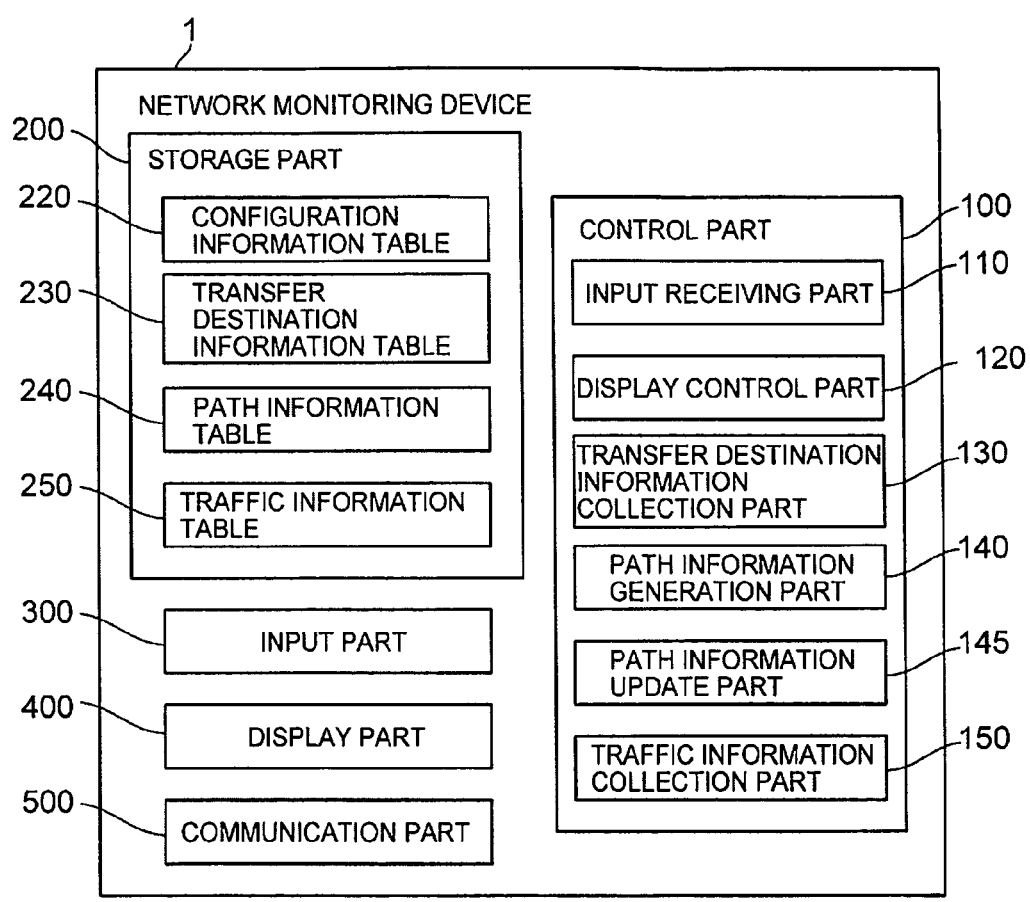
FIG. 2 is a block diagram showing a functional configuration of the network monitoring device.

FIG. 2 is a block diagram showing a functional configuration of the network monitoring device according to the first embodiment.

As shown in the figure, the network monitoring device 1 comprises a control part 100, a storage part 200, an input part 300, a display part 400 and a communication part 500.

The control part 100 comprises an input receiving part 110, a display control part 120, a transfer destination information collection part 130, a path information generation part 140, a path information update part 145, and a traffic information collection part 150.

The storage part 200 comprises a configuration information table 220, a transfer destination information table 230, a path information table 240, and a traffic information table 250.

Referring to FIGS. 3-6, examples of construction of the configuration information table 220, the transfer destination information table 230, the path information table 240, and the traffic information table 250 will be described.

FIG. 3 is a diagram showing an example of construction of the configuration information table 220.

The configuration information table 220 stores information (configuration information) on a configuration of a device (such as a router, a terminal, or the like, for example). One configuration information table 220 is generated for each device.

Each configuration information table 220 has fields 221, 222, 223 and 224.

The field 221 stores information that specifies a device ID. A device ID is information for identifying a device. In the present embodiment, the field 221 stores a device ID that can also identify a type (for example, router, terminal, or the like) of a device.

The field 222 stores information that specifies a name of the device.

The field 223 stores information that specifies a management IP address of the device. A management IP address is an IP address used, for example, for connection using SNMP, or login by the network administrator.

The field 224 stores information (interface information) on communication interfaces that the device has. The field 224 includes fields 225, 226, 227 and 228. The field 224 stores an entry for each communication interface.

The field 225 stores information that specifies an interface ID of a communication interface. An interface ID is information for identifying a communication interface.

The field 226 stores a name (interface name) of the communication interface.

The field 227 stores information that specifies an IP address assigned to the communication interface. In the present embodiment, the field 227 stores an IP address.

The field 228 stores information that specifies a subnet mask address of the IP address stored in the field 227.

In the present embodiment, a configuration information table 220 of each device on the network under monitoring is generated in advance. For example, in each configuration information table 220, configuration information inputted through the input part 300 is set by the input receiving part 110. Or, the input receiving part 110 may read a prescribed file in which configuration information is described. Or, the input receiving part 110 may receive configuration information from an external network management device through the communication part 500.

In the example shown in FIG. 1, configuration information tables 220 that store configuration information of terminals on the branch networks 3a-3e, the routers 6a-6g, and the like are generated in advance.

In the case where a communication interface is not assigned with an IP address, no value is set in the fields 227 and 228 of its entry. Further, in the case of a device (for example, a terminal such as a PC) that has only one communication interface, its field 224 stores one entry, i.e. the entry of that communication interface.

FIG. 4 is a diagram showing an example of construction of the transfer destination information table 230.

The transfer destination information table 230 stores transfer destination information of a device (for example, a router) on the monitored network. One transfer destination information table 230 is generated for each device.

In the present embodiment, transfer destination information means routing information (a routing table) of a network device such as a router.

Each transfer destination information table 230 has fields 231 and 232.

The field 231 stores information that specifies a device ID.

The field 232 stores transfer destination information. The field 232 includes fields 233, 234, 235, 236 and 237. The field 232 stores an entry for each destination IP address.

The field 233 stores information that specifies a destination IP address as a key for searching for a transfer destination.

The field 234 stores information that specifies an interface ID of a communication interface to which IP packets destined for the destination IP address stored in the field 233 are outputted.

The field 235 stores information that specifies a next hop IP address to which IP packets destined for the destination IP address stored in the field 233 are transferred.

The field 236 stores information that specifies a transfer type. For example, a transfer type "direct" indicates that the communication interface identified by the interface ID stored in the field 234 is directly coupled to the network indicated by the destination IP address stored in the field 233.

The field 237 stores information that specifies a subnet mask address of the destination IP address stored in the field 233.

FIG. 5 is a diagram showing an example of construction of the path information table 240.

The path information table 240 stores path information between a network (a destination network) indicated by a destination IP address and a network (a branch network) indicated by an IP address (a branch IP address) of a branch. One path information table 240 is generated for each combination of a destination IP address and a branch IP address.

In the present embodiment, path information is information that indicates the order of connection of network devices on a path between two networks.

Each path information table 240 has fields 241, 242 and 243.

The field 241 stores information that specifies a destination IP address (with a subnet mask) of a monitored object designated by a user. The field 241 may store information that specifies an IP address of a destination device.

The field 242 stores information that specifies a branch IP address (with a subnet mask) identified by the path information generation part 140. The field 242 may store information that specifies an IP address of a device.

The field 243 stores path information. The field 243 includes fields 244 and 245. The field 243 stores an entry for each device as a component of the path. The entries are stored in the order of connection of the respective devices on the path connecting the destination network and the branch network.

The field 244 stores information that specifies a device ID.

The field 245 stores information that specifies an interface ID of a communication interface of the device identified by the device ID stored in the field 244. The communication interface in question relays IP packets destined for the destination IP address stored in the field 241.

FIG. 6 is a diagram showing an example of construction of the traffic information table 250.

The traffic information table 250 stores traffic information collected from devices (for example, routers) on the monitored network. One traffic information table 250 is generated for each device and for each collection time.

Each traffic information table 250 has fields 251, 252 and 253.

The field 251 stores information that indicates a time at which traffic information stored in the field 253 was collected. Here, the information indicating a time may include information indicating a date.

The field 252 stores information that specifies a device ID.

The field 253 stores traffic information. The field 253 includes fields 254, 255, 256, 257 and 258. The field 253 stores an entry for each communication interface that the device has.

The field 254 stores information that specifies an interface ID of a communication interface.

The field 255 stores information that specifies a cumulative total value (a cumulative input traffic) of input traffic of the communication interface.

The field 256 stores information that specifies a value indicating a difference between the cumulative input traffic stored in the field 255 and the cumulative input traffic stored in the field 255 of the traffic information table 250 generated at the previous collection time.

The field 257 stores information that specifies a cumulative total value (a cumulative output traffic) of output traffic of the communication interface.

The field 258 stores information that specifies a value indicating a difference between the cumulative output traffic stored in the field 257 and the cumulative output traffic stored in the field 257 of the traffic information table 250 generated at the previous collection time.

Of course, constructions of the configuration information table 220, the transfer destination information table 230, the path information table 240 and the traffic information table 250 are not limited to those described above. Further, data structure is not limited to a table form.

Returning to FIG. 2, will be described the input receiving part 110, the display control part 120, the transfer destination information collection part 130, the path information generation part 140, the path information update part 145, the traffic information collection part 150, the input part 300, the display part 400, and the communication part 500.

The input receiving part 110 receives input of configuration information and the like through the input part 300 or the communication part 500. For example, the input receiving part 110 receives an IP address of a destination network as a monitored object, configuration information, and the like. Further, the input receiving part 110 stores the received configuration information in the configuration information table 220.

The display control part 120 displays a User Interface (UI) screen for receiving user's operation and a state of the monitored network, through the display part 400. For example, the display control part 120 displays a screen for inputting an IP address of a destination network as a monitored object. Further, the display control part 120 displays path information, traffic information and the like of the monitored network.

The transfer destination information collection part 130 communicates with the network devices on the monitored network through the communication part 500, to collect transfer destination information. Further, the transfer destination information collection part 130 generates transfer destination information tables 230 to store the acquired transfer destination information.

For example, the transfer destination information collection part 130 uses SNMP to acquire transfer destination information from a network device. In the example shown in FIG. 1, the transfer destination information collection part 130 collects transfer destination information of the routers 6a-6g. For example, the transfer destination information collection part 130 collects transfer information when the path information generation part 140 generates path information, or on a cycle of a prescribed time (for example, every one hour).

The path information generation part 140 generates path information between a destination network as a monitored object designated by a user and a given branch network. Then, the path information generation part 140 generates a path information table 240 to store the generated path information.

An outline of processing performed by the path information generation part 140 will be described.

The path information generation part 140 refers to the configuration information tables 220 to acquire the IP addresses of all terminals. Then, the path information generation part 140 identifies a network to which a plurality of terminals belong, and identifies the IP address of the identified network as a branch IP address. In the example shown in FIG. 1, the IP addresses of the branch networks 3a-3e are identified as branch IP addresses.

Further, by referring to the configuration information tables 220 and the transfer destination information tables 230, the path information generation part 140 sequentially identifies devices to which a destination IP address designated through the input receiving part 110 is to be transferred, so as to identify the connection order of network devices between a network indicated by a branch IP address and the network indicated by the designated destination IP address. Further, the path information generation part 140 stores entries of the identified network devices in the respective path information tables 240 in the order of connection.

In the example shown in FIG. 1, for example path information from the branch network 3d (branch IP address) to the branch network 3a (destination IP address) indicates the connection order of the router 6f, the router 6e, the router 6d and the router 6a.

The path information update part 145 judges whether it is a prescribed time to update the path information. If it is a prescribed time to update the path information, the path information update part 145 controls the transfer destination information collection part 130 and the path information generation part 140 to update the path information.

For example, as a prescribed timing, may be mentioned a time when data notifying a fault are received from a network device on the monitored network, a time when the traffic information collection part 150 collects traffic information, a time when data notifying a change of topology is received from another network management device, or the like.

The traffic information collection part 150 communicates with the network devices on the monitored network through the communication part 500, to collect traffic information. Further, the traffic information collection part 150 generates traffic information tables 250 to store the collected traffic information.

For example, the traffic information collection part 150 uses SNMP to collect information on outgoing and incoming traffic of the interfaces of the network devices. In the example shown in FIG. 1, the traffic information collection part 150 collects traffic information of the routers 6a-6g.

The input part 300 is a user interface for receiving input operation from a user.

The display part 400 is a user interface for displaying a generated screen or the like.

The communication part 500 is a communication interface for sending and receiving various kinds of information through a network.

Figure 7:
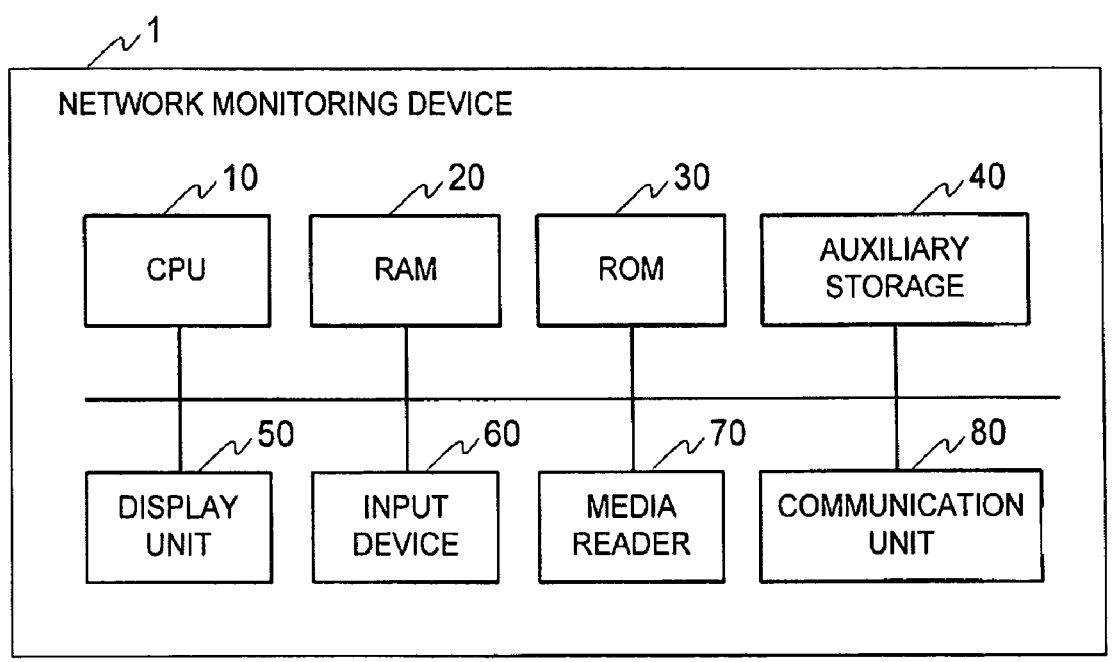
FIG. 7 is a block diagram showing an example of hardware configuration of the network monitoring device.

The network monitoring device 1 having the above-described various functions can be implemented by a computer as shown in FIG. 7, for example.

FIG. 7 is a block diagram showing an example of hardware configuration of the network monitoring device according to the first embodiment.

As shown in the figure, the network monitoring device 1 comprises a CPU 10, a RAM 20, a ROM 30, an auxiliary storage 40, a display unit 50, an input unit 60, a media reader 70, and a communication unit 80.

The CPU 10 executes various processes by executing a given network monitoring program (not shown) that is loaded from the auxiliary storage 40 into the RAM 20.

For example, the network monitoring program is an application program that can be executed on an Operating System (OS) program.

Here, the network monitoring program may be installed in the auxiliary storage 40 from a portable storage medium through the media reader 70, for example. Or, the network monitoring program may be downloaded from a network onto the auxiliary storage 40 through the communication unit 80. Or, the network monitoring program may be directly loaded from a network into the RAM 20 through the communication unit 80, to be executed by the CPU 10.

The RAM 20 stores programs executed by the CPU 10, data required for execution of the programs, and the like. The ROM 30 stores programs required for activation of the network monitoring device 1, for example.

The auxiliary storage 40 is a Hard Disk Drive (HDD) or the like, for example. The auxiliary storage 40 may be a Solid State Drive (SSD) using a flash memory or the like.

The display unit 50 is, for example, a CRT display, a Liquid Crystal Display (LCD), an Organic Electro-Luminescence display, or the like. The input unit 60 is, for example, a keyboard, a mouse, a microphone, or the like.

The media reader 70 is a device that reads information from a portable storage medium such as a CD-ROM. The communication unit 80 is coupled to a network and communicates with an external device. The communication unit 80 is, for example, a network card based on Ethernet (registered trademark).

Here, the control part 100 and the storage part 200 are implemented, for example, when the CPU 10 executes the given network monitoring program loaded into the RAM 20. Data in the storage part 200 are stored in the RAM 20 or the auxiliary storage 40, for example.

Further, the input part 300 is implemented, for example, when the CPU 10 executes a given program to control the input unit 60. The display part 400 is implemented, for example, when the CPU 10 executes a given program to control the display unit 50. The communication part 500 is implemented, for example, when the CPU 10 executes a given program to control the communication unit 80.

The configuration of the network monitoring device is not limited to the above-described one. For example, the auxiliary storage 40 may be an external storage that is connected through the communication unit 80.

Hereinabove, the configuration of the network monitoring device has been described.

Next, a network monitoring process performed by the above-described network monitoring device 1 will be described.

Figure 8:
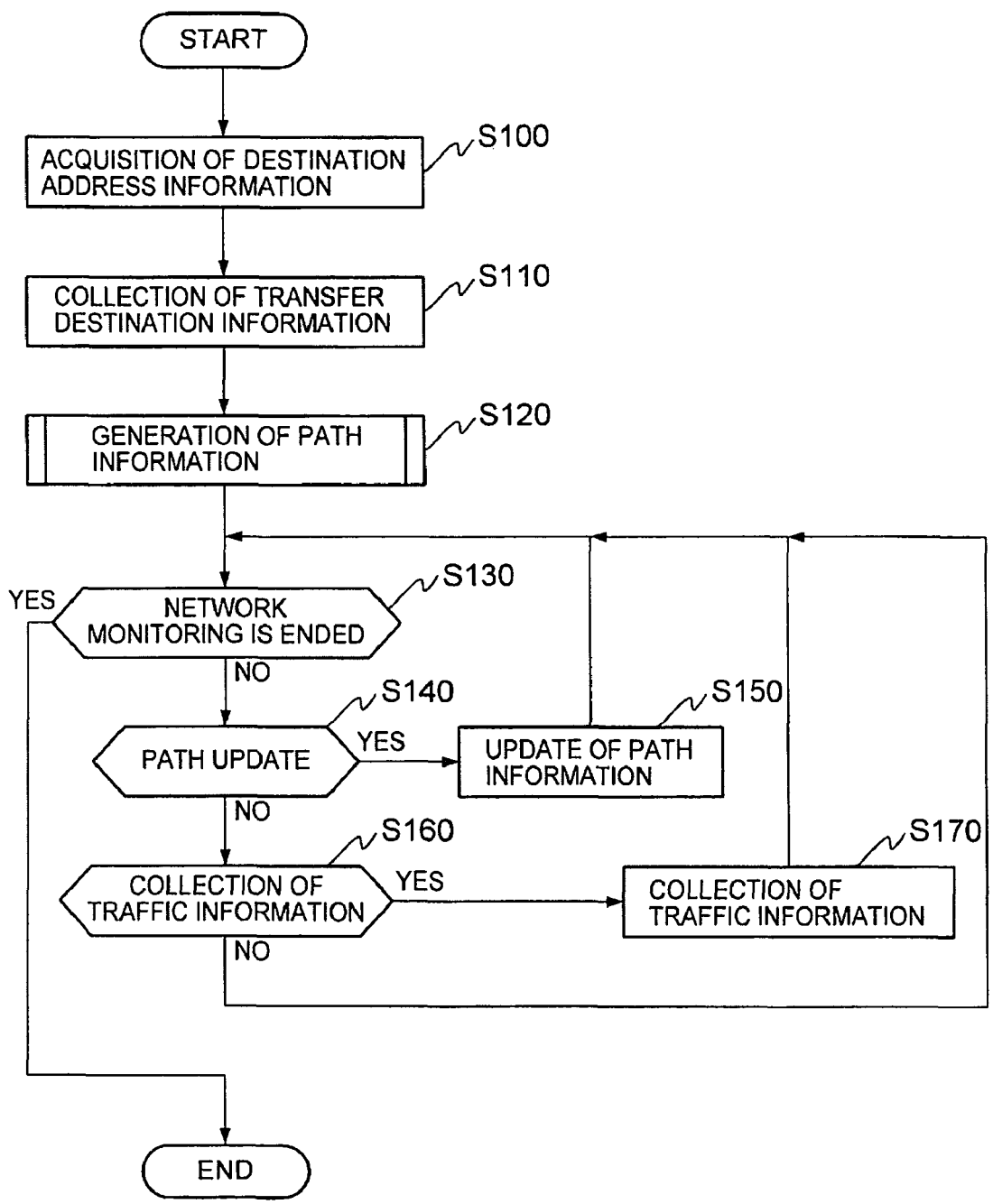
FIG. 8 is a flowchart showing a flow of a network monitoring process.

FIG. 8 is a flowchart showing a flow of a network monitoring process. This flow is started, for example, when a user's operation initiates execution of the given network monitoring program.

First, the input receiving part 110 acquires destination address information (S100).

In detail, through the display control part 120, the input receiving part 110 makes the display part 400 display, for example, a Graphical User Interface (GUI) screen for receiving input of an IP address of a destination network as a monitored object. And, through the input part 300, the input receiving part 110 receives input of a destination IP address (including subnet mask length) designated by the user.

Of course, the method of acquiring a destination IP address is not limited to that described above. For example, the input receiving part 110 may acquire a destination IP address by reading a prescribed file that describes the destination IP address. Or, the input receiving part 110 may acquire a destination IP address from an external network management device through the communication part 500.

In the example shown in FIG. 1, an IP address of a branch network 3a-3e, an IP address of a terminal on a branch network 3a-3e, or the like can be designated.

Next, the transfer destination information collection part 130 collects transfer destination information (S110).

In detail, first the transfer destination information collection part 130 refers to the configuration information table 220 of each device. Then, the transfer destination information collection part 130 acquires device IDs and management IP addresses from tables whose fields 221 respectively store device IDs showing routers, to generate a list of routers.

In the example shown in FIG. 1, the device IDs and the management IP addresses of the routers 6a-6g are on the list of routers.

Then, the transfer destination information collection part 130 uses the management IP addresses registered in the list of routers to communicate with each router through the communication part 500. Then, transfer destination information is acquired.

For example, the transfer destination information collection part 130 acquires ipRoutingTable that includes transfer destination information (routing information) from a Management Information Base (MIB) held by a router, by using SNMP. Here, ipRoutingTable has fields such as ipRouteDest, ipRouteIfIndex, ipRouteNextHop, ipRouteType and ipRouteMask. ipRoutingTable stores an entry for each destination IP address.

The field ipRouteDest stores a destination IP address. The field ipRouteIfIndex stores identification information of an output interface of the destination IP address. The field ipRouteNextHop stores a next hop IP address to which the destination IP address is transferred. The field ipRouteType stores information that indicates a type of transfer. And, the field ipRouteMask stores a subnet mask address of the destination IP address.

The transfer destination information collection part 130 generates a transfer destination information table 230 for each of the routers whose transfer destination information has been collected. In the case where a transfer destination information table 230 concerned has been already generated, the information stored in the field 232 is updated.

The transfer destination information collection part 130 stores, in the field 231, the device ID of each router whose transfer destination information has been collected.

Further, the transfer destination information collection part 130 stores, in the field 232, an entry corresponding to each entry included in the acquired ipRoutingTable.

More specifically, the transfer destination information collection part 130 stores the value of ipRouteDest in the field 233, the value of ipRouteIfIndex in the field 234, the value of ipRouteNextHop in the field 235, the value of ipRouteType in the field 236, and the value of ipRouteMask in the field 237.

In the example shown in FIG. 1, the transfer destination information collection part 130 acquires transfer destination information from the routers 6a-6g.

Next, the path information generation part 140 generates path information (S120). In the following, description will be given referring to FIG. 9.

Figure 9:
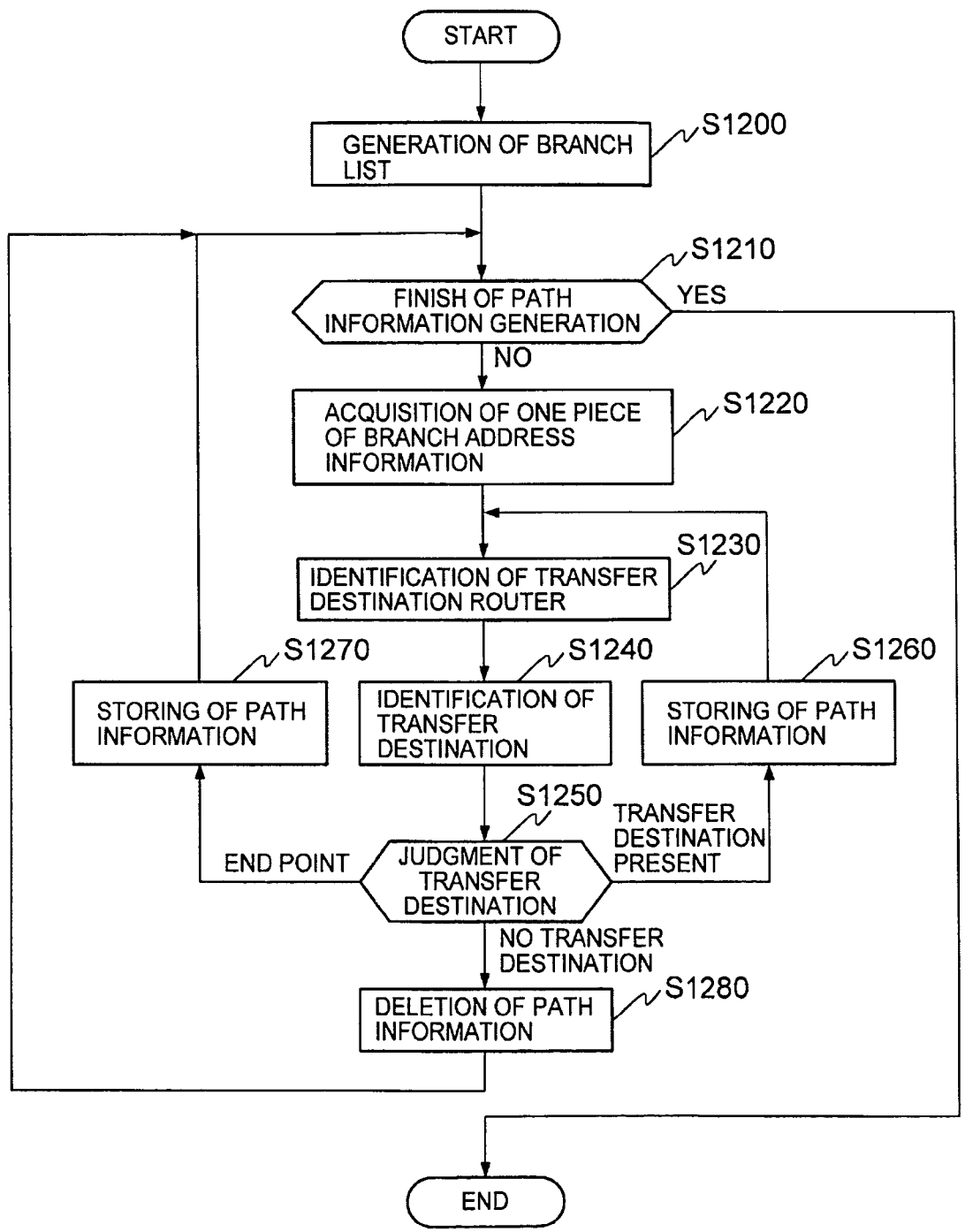
FIG. 9 is a flowchart showing a flow of a process of generating path information.

FIG. 9 is a flowchart showing a flow of a process of generating path information.

First, the path information generation part 140 generates a list of branch networks as objects of monitoring (S1200).

In detail, first the path information generation part 140 refers to the configuration information table 220 of each device. Then, from each table whose field 221 stores a device ID showing terminal, the path information generation part 140 acquires the device ID, and the IP address and the subnet mask address of each communication interface, to generate a list of terminals. It is possible to acquire the management IP address of each device.

In the example shown in FIG. 1, the device IDs, the IP addresses and the subnet mask addresses concerning the terminals on the branch networks 3a-3e are on the list of terminals.

Then, the path information generation part 140 refers to the transfer destination information table 230 of each router. Then, the path information generation part 140 calculates a logical product (AND) of the IP address and the subnet mask address of each entry stored in the field 232 of each table.

In this way, the path information generation part 140 identifies the network address of the destination IP address of each entry in the transfer destination information. Further, the range of host address is identified.

Further, the path information generation part 140 refers to the generated list of terminals. Then, the path information generation part 140 calculates a logical product (AND) of the IP address and the subnet mask address for each terminal.

In this way, the path information generation part 140 identifies the network address of the IP address of each terminal.

Then, the path information generation part 140 compares the identified network address with the identified network address of the IP address of each terminal for each destination IP address.

Then, the path information generation part 140 identifies a destination IP address having a network address with which network addresses of a plurality of terminals coincide.

The path information generation part 140 adds, as a branch IP address, the IP address (including subnet mask length) of thus-identified destination IP address to the list of branch networks.

In the example shown in FIG. 1, the IP addresses of the branch networks 3a-3e are listed.

By finding an IP address of each network to which a plurality of terminals belong and by identifying such IP addresses as IP addresses of branch networks, specific kinds of IP addresses are removed from objects of path information generation.

For example, an IP address of a relay network used for coupling routers with each other is removed. Further, an IP address of a network coupled with one terminal used for managing routers is removed.

Next, the path information generation part 140 judges whether generation of path information has finished or not (S1210).

In detail, the path information generation part 140 judges whether generation of path information has finished or not with respect to all the IP addresses of the branches included in the branch network list generated in S1200.

Then, when it is judged that generation of path information has finished (YES in S1210), the present flow is ended. On the other hand, when it is judged that generation of path information has not finished (NO in S1210), then the flow proceeds to S1220.

In the case of judgment that generation of path information has not finished (NO in S1210), the path information generation part 140 acquires one piece of branch address information (S1220). In detail, one branch IP address for which path information has not been generated yet is acquired from the branch network list generated in S1200.

Further, the path information generation part 140 generates a path information table 240. The destination IP address designated in S100 is stored in the field 241. And, the acquired branch IP address is stored in the field 242.

Next, the path information generation part 140 generates path information between the network indicated by the destination IP address designated in S100 and the network indicated by the branch IP address acquired in S1220 (S1230-S1280).

First, the path information generation part 140 identifies a transfer destination router (S1230).

Now, will be described processing performed in the case where a transfer destination router is identified just after the branch IP address has been acquired in S1220.

In this case, first the path information generation part 140 identifies a router that is directly coupled to the network indicated by the acquired branch IP address.

In detail, the path information generation part 140 refers to the configuration information table 220 of each router. Then, the path information generation part 140 calculates a logical product of the IP address and the subnet mask address of each entry stored in the field 224 of each table.

In this way, the path information generation part 140 identifies the network address of the IP address of each entry in the interface information.

Then, the path information generation part 140 compares the network address of the branch IP address acquired in S1220 and the identified network address of the IP address of each communication interface.

Then, the path information generation part 140 identifies an IP address that has the same network address as that of the branch IP address. Further, the path information generation part 140 refers to a configuration information table 220 whose field 227 stores an IP address coincident with the identified IP address, and acquires the device ID from its field 221.

In this way, the path information generation part 140 identifies the router that is directly coupled to the network indicated by the acquired branch IP address.

In the case where, in the example shown in FIG. 1, path information of the path from the branch network 3d to the branch network 3a as the destination is to be generated, the router 6f is identified as the router that is directly coupled to the branch network 3d.

Now, will be described processing performed in the case where a router as a transfer destination is to be identified when it has been judged in the below-described S1250 that a transfer destination exists ("transfer destination present" in S1250, S1260).

In this case, first the path information generation part 140 identifies a router that has the IP address of the transfer destination identified in S1240.

In detail, the path information generation part 140 acquires the next hop IP address (field 235) and the subnet mask address (field 237) identified in S1240.

Then, the path information generation part 140 refers to the configuration information table 220 of each router. And, the path information generation part 140 compares the acquired next hop IP address and subnet mask address with an IP address and a subnet mask address of each entry stored in the field 224 of each table.

Then, the path information generation part 140 identifies an IP address and a subnet mask address that are coincident with the acquired next hop IP address and subnet mask address. Further, the path information generation part 140 refers to the configuration information table 220 that includes the identified IP address and subnet mask address, to acquire the device ID from the field 221.

In this way, the path information generation part 140 identifies the router that has the IP address of the transfer destination identified in S1240. In other words, the router coupled next to the router indicated in the entry stored last in the field 243 of the path information table 240 in S1260.

In the case where, in the example shown in FIG. 1, path information of the path from the branch network 3d to the branch network 3a is to be generated, the router 6e is identified as the router coupled next to the router 6f.

Now, will be described processing performed in the case where a router having the IP address of the transfer destination identified in S1240 cannot have been identified.

For example, in the case where, in the example shown in FIG. 1, path information of the path from the branch network 3d to the branch network 3a (destination) is to be generated, the destination information of the router 6d is used to search for the IP address of a transfer destination while using the IP address of the branch network 3a as a key. In this case, the router 6d is coupled to the WAN 4, and accordingly the search result shows an IP address of a network device in the WAN 4.

However, since the network device in the WAN 4 is not an object of monitoring by the network monitoring device 1, it is impossible to acquire the configuration information and the transfer destination information of the device. Thus, it is impossible to identify the device ID of the router having the IP address of the transfer destination.

Thus, in such a case, the network monitoring device 1 searches the routers as objects of monitoring for a router that is coupled, through the WAN 4, next to the router indicated by the entry stored in S1260 in the path information table 240.

In detail, the path information generation part 140 acquires the device ID of the entry stored last in the field 243 of the path information table 240 in S1260.

And, the path information generation part 140 refers to the configuration information table 220 whose field 221 stores the same device ID as the acquired device ID, to acquire the management IP address. Or, an IP address stored in the field 224 may be acquired.

Then, the path information generation part 140 logs in to the router to which the acquired management IP address has been assigned, through the communication 500 and using, for example, telnet or rlogin.

The path information generation part 140 controls the logged-in router, to issue a traceroute (tracert) command by designating, as the destination, the destination IP designated in S100 or an IP address of a terminal or router on the network indicated by that destination IP address. Traceroute command is a command to display a list of paths between the device that has issued the command and a designated destination.

Here, an IP address of a terminal or router on the network indicated by the destination IP address can be acquired by using the configuration information tables 220.

While the router is executing the traceroute command, the path information generation part 140 acquires IP addresses outputted sequentially as results of execution of the command in question. Further, the path information generation part 140 refers to interface information stored in the field 224 of the configuration information table 220 of each router. Then in the order of acquisition of the IP addresses, the path information generation part 140 searches for an entry that has an IP address coincident with each of the acquired IP addresses.

When an entry having an IP address coincident with an acquired IP address is identified for the first time, the path information generation part 140 acquires the device ID from the field 221 of the configuration information table that includes the entry in question.

In this way, among the routers for which the configuration information tables 220 have been generated, the path information generation part 140 identifies the router that is coupled, through an unclear path such as a WAN, next to the router indicated by the entry stored last in the field 243 of the path information table 240 in S1260.

That is to say, the path information generation part 140 identifies the router that is coupled, through an unclear path, next to the router indicated by the entry stored last in the field 243 of the path information table 240 in S1260.

In the example shown in FIG. 1, to generate path information from the branch network 3d to the branch network 3a (destination), the router 6d issues a traceroute command destined to a terminal on the branch network 3a. As a result, the router 6a coupled to the router 6d through the WAN 4 is identified as the router coupled next to the router 6d.

Here, a traceroute command may be issued from a router indicated by some entry stored in the field 243 of the path information table 240 in S1260. Or, a traceroute command may be issued from the network monitoring device 1, a terminal on the network indicated by the branch IP address acquired in S1220, or the like.

Further, in the case where a device ID of such a router having the IP address of the transfer destination cannot be identified, it is possible to add an entry in the field 243 of the path information table 240 and to set a prescribed value (for example, "−1") in its fields 244 and 245. By this, it is possible to record information indicating that an unclear element exists (for example, a WAN intervenes) in the path information.

Hereinabove, the processing in S1230 has been described.

When the router as the transfer destination is identified (S1230), the path information generation part 140 uses the transfer destination information of the router in question, to identify the transfer destination of the designated destination IP address (S1240).

In detail, the path information generation part 140 refers to the field 232 of the transfer destination information table 230 whose field 231 stores the same device ID as that of the router identified in S1230.

Then, the path information generation part 140 identifies an entry that has the same destination IP address as the destination IP address designated in S100. Or, the path information generation part 140 identifies an entry having a destination IP address that includes the destination IP address designated in S100.

That is to say, the path information generation part 140 identifies an entry having a destination IP address whose prefix coincident with the destination IP address designated in S100 has the maximum length.

If it is impossible to identify such an entry, the path information generation part 140 identifies an entry whose field 233 stores a default route (for example, "0.0.0.0"). Here, a default route means routing information used to transfer packet data destined to a destination IP address that does not coincide with any destination IP address in the routing table to a prescribed router.

Thus, one entry is identified among the pieces of transfer destination information stored in the field 232 of the transfer destination information table 230. Further, the next hop IP address indicating the transfer destination of the designated destination IP address is identified.

When the transfer destination is identified (S1240), the path information generation part 140 performs judgment of the transfer destination (S1250).

In detail, the path information part 140 refers to the entry identified in S1240 and performs judgment as follows.

In the case where the destination IP address stored in the field 233 is not the default route and the transfer type stored in the field 236 is "direct" ("end point" in S1250), the flow proceeds to S1270.

That is to say, in the case of the above conditions, the router having the entry of the transfer destination information identified in S1240 is directly coupled to the network indicated by the destination IP address designated in S100, through the output interface indicated by the interface ID of the entry.

Thus, the path information generation part 140 can judge that the router at the end point of the path from the branch IP address acquired in S1220 to the destination IP address designated in S100 has been reached.

On the other hand, in the case where the destination IP address stored in the field 233 is the default route and the next hop IP address stored in the field 235 is the same IP address as that assigned to the interface ID of some entries stored in the field 243 of the path information table 240 in S1260 ("no transfer destination" in S1250), then the flow proceeds to S1280. Here, the IP address assigned to an interface ID can be identified by using the configuration information table 220.

That is to say, if the above conditions are satisfied, the destination router is included in already-generated path information. Thus, the path information generation part 140 can judge that a path reaching the destination IP address designated in S100 from the branch IP address acquired in S1220 does not exist.

If all of the above cases are not true ("transfer destination present" in S1250), then the path information generation part 140 judges that path information can be generated successively. And, the flow proceeds to S1260.

When it is judged that a transfer destination exists ("transfer destination present" in S1250), the path information generation part 140 stores the path information in the path information table 240 (S1260).

In detail, the path information generation part 140 adds an entry in the field 243 of the path information table 240 generated in S1220. That is to say, the device ID of the router having the entry identified in S1240 is stored in the field 244. Further, the interface ID of the entry identified in S1240 is stored in the field 245. Then, the flow returns to S1230.

On the other hand, when it is judged that the end point of the path has been reached ("end point" in S1250), the path information generation part 140 stores the path information in the path information table 240 (S1270). Contents of processing are same as S1260. Then, the flow returns to S1210.

On the other hand, when it is judged that a path does not exist ("no transfer destination" in S1250), the path information generation part 140 deletes the path information (S1280).

In detail, the path information generation part 140 deletes the path information table 240 corresponding to a combination of the destination IP address and the branch IP address generated in S1220 as an object of generation of path information. Then, the flow returns to S1210.

Thus, path information has been generated.

If a plurality of destination IP addresses are designated in S100, it is sufficient to perform S120 for each destination IP address.

In the above description, path information from a branch IP address to a destination IP address is generated by sequentially searching for a transfer destination of the designated destination IP address. However, the path information generation part 140 may generate path information from a designated destination IP address to a branch IP address by sequentially searching for a transfer destination of the branch IP address. In this case, with respect to a router on the path, an interface ID of a communication interface that receives data sent from the branch network can be acquired.

Further, the input receiving part 110 may receive a source IP address instead of a destination IP address. In this case, the path information generation part 140 generates path information from the designated source IP address to a branch IP address, or from a branch IP address to the designated source IP address.

Returning to FIG. 8, description will be continued. When the path information has been generated (S120), it is judged whether an instruction to end the network monitoring process has been given (S130).

In detail, the input receiving part 110 receives operation of a user such as the network administrator through the input part 300, to judge whether an instruction to end the network monitoring process has been given. Such an instruction may be received from an external network management device through the communication part 500. When it is judged that such an instruction has been given (YES in S130), the present flow is ended. On the other hand, when it is judged that such an instruction has not been given (NO in S130), then the flow proceeds to S140.

In the case where an instruction to end the network monitoring process has not been given (NO in S130), the path information update part 145 judges whether a condition for updating path information has been satisfied (S140).

In detail, the path information update part 145 monitors one or more of the following conditions (1)-(3). When it is judged that a condition for updating path information has been satisfied (YES in S140), the flow proceeds to S150. On the other hand, when it is judged that no condition for updating path information has been satisfied (NO in S140), the flow proceeds to S160.

(1) Case where a fault or the like has occurred in a communication interface of a router as a component of the path information:

In detail, the path information update part 145 monitors a message notifying a fault or the like in a communication interface, which is sent from a router under monitoring.

For example, as a message notifying a fault or the like, an SNMP trap (a linkDown trap, a linkUp trap) may be used. A linkDown or linkUp trap includes identification information (ifIndex) of a communication interface with which a line is linked down or up, identification information of a device that has the communication interface in question, an IP address, and the like.

When such a message is received, first the path information update part 145 acquires the identification information of the device and the identification information of the communication interface from the message.

Further, the path information update part 145 refers to the field 243 of each path information table 240. And, the path information update part 145 searches for an entry having the device ID and the interface ID corresponding to the acquired identification information of the device and the acquired identification information of the communication interface.

When such an entry is identified, the path information update part 145 judges that the condition for updating the path information including the identified entry is satisfied. On the other hand, when such an entry cannot be identified, it is judged that the condition for updating the path information is not satisfied.

(2) Case where traffic information is collected:

In detail, the path information update part 145 updates path information synchronously with the prescribed period for the traffic information collection part 150 to collect traffic information. In other words, when a time to collect traffic information comes, it is judged that the condition for updating the path information is satisfied.

(3) Case where the network topology has been changed:

In detail, the path information update part 145 monitors a message notifying a change of topology of the monitored network, which is sent from an external network management device.

Such a message includes, for example, an IP address of a new branch network added to the monitored network, an IP address of a branch network deleted from the monitored network, or the like.

When such a message is received, the path information update part 145 judges that the condition for updating the path information is satisfied.

Of course, conditions for updating path information are not limited to those described above. For example, path information may be updated on a cycle of a prescribed time.

When a condition for updating the path information is satisfied (YES in S140), the path information update part 145 updates the path information (S150). Description will be given for each of the above cases (1)-(3).

(1) Case where a fault or the like has occurred in a communication interface of a router as a component of the path information:

In detail, first the path information update part 145 instructs the transfer destination information collection part 130 to collect transfer information from the router in which the fault has occurred.

The transfer destination information collection part 130 collects transfer destination information from the router indicated by the device ID that is included in the entry (in the path information) identified in S140. Further, the transfer destination information stored in the field 232 of the transfer destination information table 230 of the router in question is updated.

When collection of the transfer destination information is finished, the path information update part 145 instructs the path information generation part 140 to regenerate path information that includes the entry identified in S140.

The path information generation part 140 regenerates path information between a destination IP address stored in a path information table 240 that includes the entry identified in S140 and a branch IP address. Then, the path information stored in the field 243 is updated. Regeneration of path information is performed in a process similar to S120.

Transfer destination information may be collected not only from the router in which a fault has occurred but also a router whose NextHop is the router in question. Or, transfer destination information may be collected from all the routers registered in the configuration information tables 220. Further, path information of all the path information tables 240 may be regenerated.

(2) Case where traffic information is collected:

In detail, first the path information update part 145 instructs the transfer destination information collection part 130 to collect transfer destination information from all the routers for which the respective configuration information tables 220 have been generated.

Further, the path information update part 145 instructs the path information generation part 140 to regenerate the path information of all the path information tables 240. Regeneration of the path information is performed in a process similar to S120.

(3) Case where the network topology has been changed:

In detail, first the path information update part 145 acquires the IP address of the newly-added branch network, which is included in the message received in S140. Further, the path information update part 145 instructs the input receiving part 110 to collect changed configuration information (for example, interface information of a router, information on terminals, and the like).

The input receiving part 110 receives input of configuration information through the input part 300 or the communication part 500. Then, configuration information tables 220 are generated or updated.

Further, the path information update part 145 instructs the path information generation part 140 to generate path information between the newly-added branch network and the designated destination network.

The path information generation part 140 generates path information between the destination IP address designated in S100 and the newly-added branch IP address. Generation of path information is performed in a process similar to S120.

In the case where the message received in S140 includes an IP address of a branch network deleted from the monitored network, the path information update part 145 instructs the path information generation part 140 to delete the path information table 240 that includes the branch IP address coincident with the IP address in question.

After the path information is updated as described above, the flow returns to S130.

On the other hand, when it is judged that no condition for updating path information has been satisfied (NO in S140), the traffic information collection part 150 judges whether a condition for collecting traffic information has been satisfied (S160).

In detail, the traffic information collection part 150 collects traffic information on a cycle of a prescribed time (for example, every one hour). When it is judged that the condition for collecting traffic information has been satisfied (YES in S160), the flow proceeds to S170. On the other hand, when it is judged that the condition for collecting traffic information has not been satisfied (NO in S160), the flow returns to S130.

Of course, the cycle of the prescribed time may be designated by the user through the input receiving part 110. Or, collection of traffic information may be performed when the user gives an instruction.

When it is judged that the condition for collecting traffic information has been satisfied (YES in S160), the traffic information collection part 150 collects traffic information (S170).

In detail, the traffic information collection part 150 communicates through the communication part 500 with all the routers for which the respective configuration information tables 220 are generated, to acquire traffic information from each router.

For example, the traffic information collection part 150 acquires ifTable that includes information on communication interfaces from the MIB held by a router by using SNMP. ifTable has fields such as ifIndex, ifOutOctets, ifInOctets, and the like. ifTable stores an entry for each communication interface.

ifIndex stores identification information of a communication interface. ifOutOctets stores information indicating output traffic of the communication interface. And, ifInOctets stores information indicating input traffic of the communication interface.

The traffic information collection part 150 generates a traffic information table 250 for each router for which the traffic information has been collected. Then, the traffic information collection part 150 stores the time when the traffic information was collected in the field 251. And, the device ID for which the traffic information has been collected is stored in the field 252.

Further, the traffic information collection part 150 adds an entry corresponding to each entry included in the acquired ifTable to the field 253.

That is to say, the traffic information collection part 150 stores the value of ifIndex in the field 254.

Further, the traffic information collection part 150 stores the value of ifInOctets in the field 255. Further, the traffic information collection part 150 calculates a difference between the value of the field 255 and the value stored in the field 255 of the traffic information table 250 generated at the previous collection time, and stores the value of difference in the field 258.

As described above, the network monitoring process is performed, path information is generated and updated, and traffic information is collected and updated.

Next, will be described a display process performed by the network monitoring device 1 on the basis of the path information generated in the above-described network monitoring process.

The display control part 120 displays the path information and the traffic information generated in the network monitoring process on the display part 400.

When for example the processing is performed in S120, S150 and S170, the display control part 120 displays the path information and the traffic information between the destination IP address designated in S100 by the user and a branch IP address. In the case where the path information or the traffic information is updated, the display concerning the updated path information or traffic information may be updated.

Here, the display control part 120 may display a list of destination IP addresses designated in S100 by the user, and display the path information and the traffic information between a destination IP address selected by the user and a branch IP address.

Further, in the case where the display control part 120 receives a user's instruction from an external device through the communication part 500, the display control part 120 may send information for displaying the path information and the traffic information to the external device.

Of course, the method and timing of display are not limited to those described above.

First, a process of displaying path information without having been processed will be described.

In detail, the display control part 120 uses the configuration information tables 220, the path information tables 240 and the traffic information tables 250, to display a screen as shown in FIG. 10. FIG. 10 is a view showing an example of display of path information between a destination and a branch.

As shown in the figure, a path display screen 900a has a destination information field 910, a path information field 920, and a branch information field 930.

The destination information field 910 displays information on a designated destination network. The destination information field 910 has a destination name field 911 and a destination IP address field 912.

The destination name field 911 displays a name of the designated destination network. The destination IP address field 912 displays a designated destination IP address.

The path information field 920 displays path information and traffic information between the designated destination network and the branch network. The path information field 920 has a device information field 921, an IP address field 922, an input traffic field 923, and an output traffic field 924. The path information field 920 displays an entry for each device as a component of the path.

The device information field 921 displays a name of a device and an interface ID of an output interface of the device. The IP address field 922 displays an IP address of the output interface.

The input traffic field 923 displays input traffic of the output interface. The output traffic field 924 displays output traffic of the output interface.

The branch information field 930 displays information on the branch network. The branch information field 930 has a branch name field 931 and a branch IP address field 932.

The branch name field 931 displays a name of the branch network. The branch IP address field 932 displays a branch IP address.

Of course, construction of the path display screen is not limited to the above.

The display control part 120 refers to the path information table 240 that includes the destination IP address and the branch IP address as the objects of display. Then, the destination IP address stored in the field 241 is displayed in the destination IP address field 912. And, the branch IP address stored in the field 242 is displayed in the branch IP address field 932.

If it is arranged that a user previously inputs a list associating IP addresses with respective branch names, the destination name field 911 and the branch name field 931 can display the destination name and the branch name corresponding to the destination IP address and the branch IP address respectively.

Further, in the order of the entries stored in the field 243 of the path information table 240 as the object of display, the display control part 120 displays respective corresponding entries in the path information field 920. In the following, a method of displaying each entry will be described.

First, the display control part 120 acquires the device ID and the interface ID from the field 244 and the field 245.

Then, the display control part 120 refers to the configuration information table 220 whose field 221 stores the same device ID as the acquired device ID, to acquire the device name stored in the field 222.

Further, the display control part 120 refers to the interface information stored in the field 224, to identify the entry having the same interface ID as the acquired interface ID. And, the display control part 120 acquires the IP address of the identified entry.

Then, the display control part 120 associates the acquired device name with the interface ID, and displays them in the device information field 921. Further, the acquired IP address is displayed in the IP address field 922.

Further, the display control part 120 refers to the traffic information table 250 having the latest collection time among the traffic information tables 250 whose fields 252 store the same device ID as the acquired device ID. Further, the display control part 120 refers to the traffic information stored in the field 253, to identify the entry having the same interface ID as the acquired interface ID. And, the display control part 120 acquires the input traffic and the output traffic of the identified entry.

Then, the display control part 120 displays the acquired input traffic in the input traffic field 923. Further, the display control part 120 displays the acquired output traffic in the output traffic field 924.

The example of the figure shows the path information between the branch network 3a (branch A) and the branch network 3d (branch D) of FIG. 1. That is to say, the path information field 920 displays the router 6a (R-a), the router 6d (R-d), the router 6e (R-e) and the router 6f (R-f) in the order of closeness to the branch network 3a (branch A) as the destination network.

In the case where the path information as the object of display includes an entry indicating intervention of a WAN (for example, an entry whose values of the fields 244 and 245 are "−1", which will be hereinafter referred to as "WAN entry"), the display control part 120 may display an entry corresponding to a WAN entry in the path information field 920. In this case, the display control part 120 displays the entry in question in such a mode that a user can recognize the entry is a WAN.

Further, out of the path information, the display control part 120 may display path information that includes entries on the side of the destination network from the WAN entry and path information that includes entries on the side of the branch network from the WAN entry in separate path display screens 900a respectively. It may be arranged that a user can determine whether path information should be displayed in separate path display screens 900a or not.

Thus, the path information and the traffic information between the designated destination network and the branch network are displayed.

Next, a process of displaying path information integrated by a prescribed method will be described.

Figure 11:
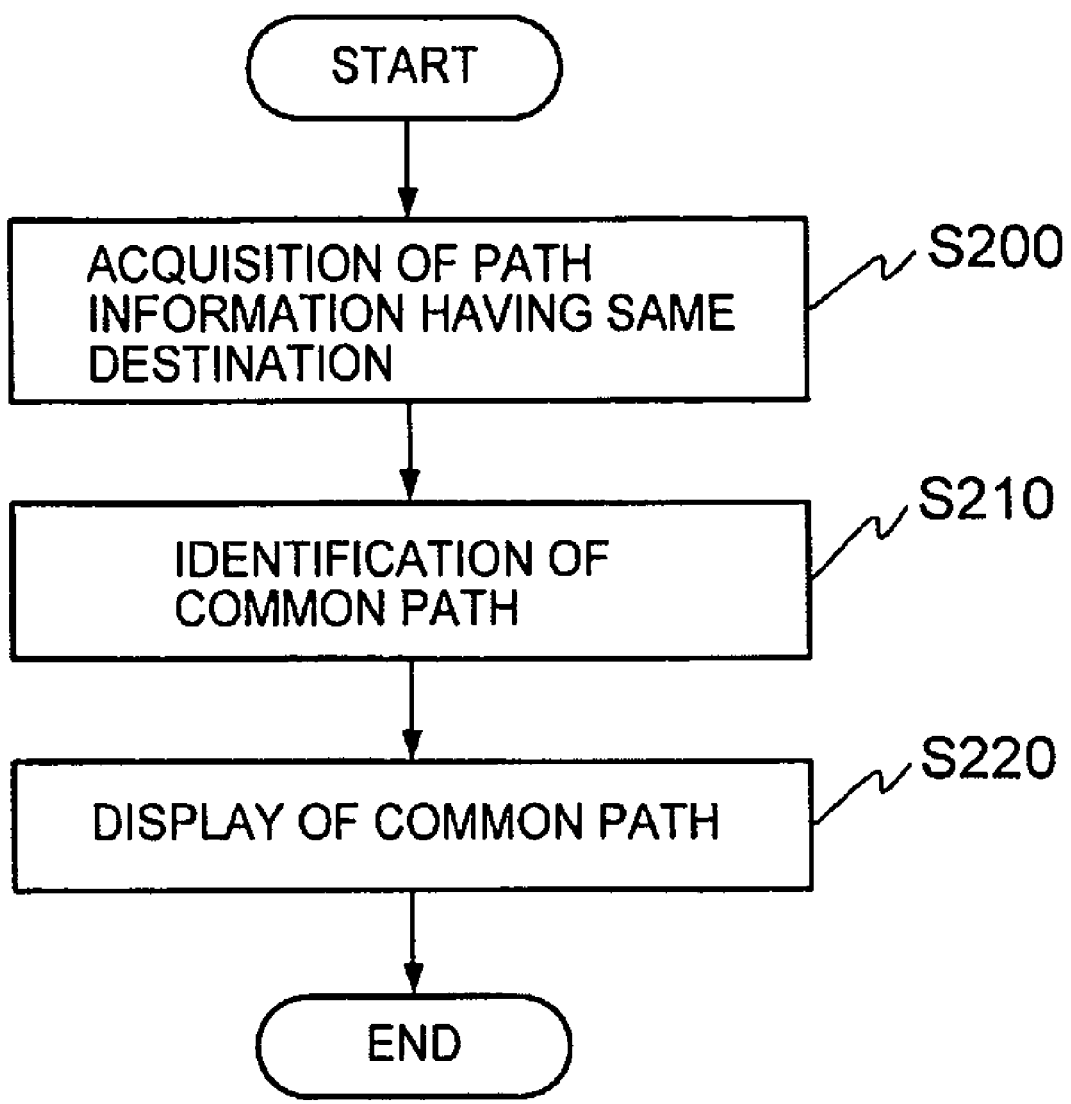
FIG. 11 is a flowchart showing a flow of a process of integrating and displaying path information.

FIG. 11 is a flowchart showing a flow of a process of integrating and displaying path information.

First, the display control part 120 acquires path information of the same destination (S200).

In detail, the display control part acquires path information tables 240 having the same destination IP address out of a plurality of path information tables 240.

If, in the example shown in FIG. 1, a user designates the IP address of the branch network 3a (branch A) as a destination IP address, there are path information tables 240 storing path information between the branch network 3a (branch A) and each of the branch networks 3b-3e (branches B-E). Thus, as path information having the same destination IP address, path information between the branch network 3a (branch A) and each of the branch networks 3b-3e (branches B-E) is acquired.

After the acquisition of the path information of the same destination (S200), the display control part 120 identifies a common path between those pieces of path information (S210).

In detail, the display control part 120 compares path information stored in the field 243 of each of the path information tables 240 acquired in S200, and identifies a part in which the order of a prescribed number of consecutive entries (device IDs and interface IDs) agrees. That is to say, the display control part 120 identifies a common path. Further, the display control part 120 identifies path information tables 240 that include the common path.

Here, the number of entries in a common path may be a previously-determined value. Or, a user may designate the number.

In the example shown in FIG. 1, as common path information between the path connecting the branch network 3a (branch A) as a destination and the branch network 3d (branch D) and the path connecting the branch network 3a (branch A) as a destination and the branch network 3e (branch E), path information consisting of the router 6a (R-a), the router 6d (R-d) and the router 6e (R-e) is identified.

Further, as path information that includes the common path information, path information between the branch network 3a (branch A) and the branch network 3d (branch D) and path information between the branch network 3a (branch A) and the branch network 3e (branch E) are identified.

When the common path is identified (S210), the display control part 120 displays the common path (S220).

In detail, the display control part 120 uses the configuration information tables 220, the path information tables 240 and the traffic information tables 250, to display a screen as shown in FIG. 12. FIG. 12 is a view showing an example of display of common path information between a destination and a plurality of branches.

As shown in the figure, a path display screen 900b is similar to the path display screen 900a (See FIG. 10). As a different point, the branch information field 930 displays entries associating respectively the branch names with the branch IP addresses in the path information tables 240 that include the identified common path information.

Of course construction of the path display screen is not limited to the above.

The display control part 120 first refers to the path information tables 240 identified in S210, to display the destination IP address in any table in the destination IP address field 912. Further, the display control part 120 displays entries corresponding respectively to the branch IP addresses of the path information tables 240 in the branch IP address field 932.

Further, the display control part 120 may display the branch name corresponding to the destination IP address in the destination name field 911. Further, the branch name field 931 may display the branch names corresponding to the respective branch IP addresses.

Further, the display control part 120 refers to the path information tables 240 identified in S210, to acquire from any path information table 240 information on each entry included in the common path information identified in S210. Then, the display control part 120 displays in the path information field 920 entries corresponding respectively to the acquired entries. A method of displaying each entry is similar to that for the path display screen 900a.

The example of the figure displays the common path information (the router 6a (R-a), the router 6d (R-d) and the router 6e (R-e)) between the path between the branch network 3a (branch A) and the branch network 3d (branch D) and the path between the branch network 3a (branch A) and the branch network 3e (branch E) in FIG. 1.

That is to say, the path information field 920 displays the router 6a (R-a), the router 6d (R-d) and the router 6e (R-e) in the order of closeness to the branch network 3a (branch A). Further, the branch information field 930 displays the branch names and the IP addresses of the branch network 3d (branch D) and the branch network 3e (branch E).

In this way, the common path information is integrated and displayed.

In S210, the display control part 120 may identify a common path with respect to paths on the side of the branch networks from the WAN entry, among path information having the same destination. Or, the display control part 120 may identify a common path with respect to paths on the side of the destination network from the WAN entry. It may be arranged that a user can select the side of the branch networks or the side of the destination network from the WAN entry.

In the case where the identified common path includes a WAN entry, the display control part 120 may display, out of the common path, path information that includes entries on the side of the destination network from the WAN entry and path information that includes entries on the side of the branch networks from the WAN entry in separate path display screens 900b respectively. It may be arranged that a user can determine whether path information should be displayed in separate path display screens 900b or not.

The above description has been made with respect to pieces of path information having the same destination IP address. However, a common path may be identified and displayed whether destination IP addresses are same or different.

Next, a process in which path information extracted by a prescribed method is added to integrated path information will be described.

Figure 13:
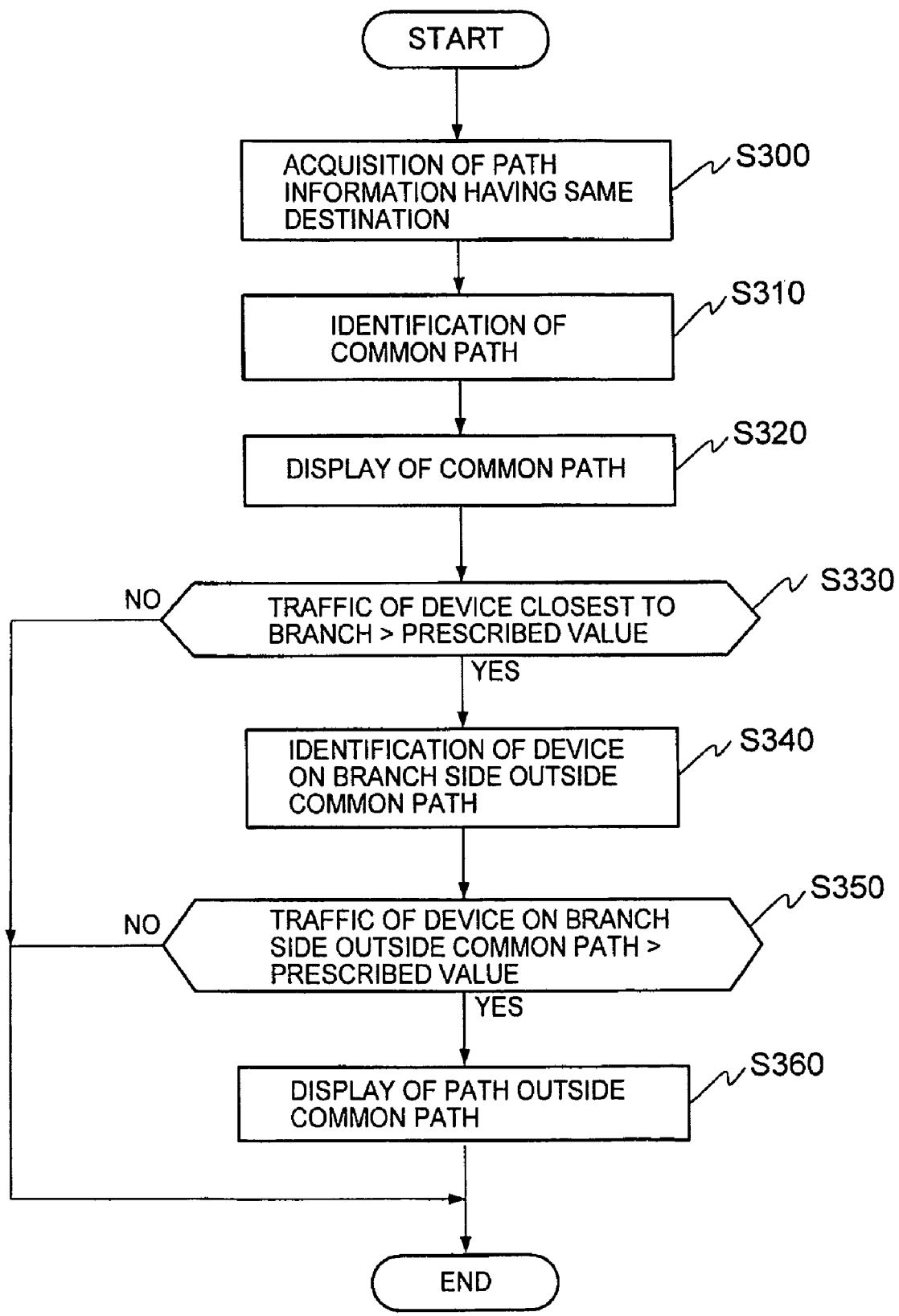
FIG. 13 is a flowchart showing a flow of a process in which path information is added to integrated path information and the result is displayed.

FIG. 13 is a flowchart showing a flow of a process in which path information is added to integrated path information and the result is displayed.

The steps S300-S320 are similar to S200-S220 (See FIG. 11).

After displaying the common path (S320), the display control part 120 judges whether the traffic of the device closest to the branch networks among the devices constituting the common path exceeds a prescribed value (S330).

In detail, first the display control part 120 refers to the path information tables 240 identified in S310, to identify an entry closest to the branch networks among the entries included in the common path identified in S310. Further, the display control part 120 acquires the device ID and the interface ID from the fields 244 and 245.

Then, the display control part 120 refers to the traffic information table 250 having the latest collection time among the traffic information tables 250 whose fields 252 store the same device ID as the acquired device ID. Further, the display control part 120 refers to the traffic information stored in the field 253, to identify the entry having the same interface ID as the acquired interface ID. And, the display control part 120 acquires the input traffic of the identified entry.

Then, the display control part 120 judges whether the acquired input traffic exceeds a prescribed threshold. Here, the prescribed threshold is, for example, a value indicating traffic that leads to router's transfer performance deterioration, network performance deterioration, or the like. This value can be previously set by a user such as the network administrator.

When it is judged that the acquired input traffic exceeds the prescribed threshold (YES in S330), the flow proceeds to S340. On the other hand, when it is judged that the acquired input traffic does not exceed the prescribed threshold (NO in S330), the processing is ended.

When it is judged that the acquired input traffic exceeds the prescribed threshold (YES in S330), the display control part 120 may highlight the input traffic field 923 displaying the input traffic in question in a different color from colors of the other fields. In that case, it is easy for a user to specify a path or a device that should be inspected fully.

Further, the display control part 120 may send the interface ID of the interface of which the acquired input traffic exceeds the prescribed threshold, the device ID of the device having the interface in question, the management IP address of the device, and the like to an external network management device. Further, these pieces of information may be outputted into a prescribed file.

For example, in the case where common path information (the router 6a (R-a), the router 6d (R-d) and the router 6e (R-e)) between the path between the branch network 3a (branch A) and the branch network 3d (branch D) and the path between the branch network 3a (branch A) and the branch network 3e (branch E) in the example of FIG. 1 is displayed, the router 6e (R-e) is identified as the device closest to the branch networks among the devices constituting the common path.

Further, as the input traffic, the input traffic of the output interface of the router 6e (R-e) toward the branch network 3a (branch A) is acquired.

Here, if a data center is constructed on the branch network 3a (branch A), various services are provided from the branch network 3a (branch A) to the branch network 3d (branch D) and the branch network 3e (branch E).

In that case, sometimes an amount of data (downstream data amount) sent from the branch network 3a (branch A) to the branch network 3d (branch D) or the branch network 3e (branch E) might vary largely depending on time zones. Thus, in the present flow, the input traffic of a communication interface that receives downstream data is used for judgment. Of course, output traffic may be used. Further, a combination of input traffic and output traffic may be used for judgment.

When it is judged that the traffic of the device closest on the common path to the branch networks exceeds the prescribed value (YES in S330), the display control part 120 identifies devices that are outside the common path and on the side of the branches (S340).

In detail, the display control part 120 refers to the path information tables 240 that include the common path information identified in S310. Then, the display control part 120 refers to the path information in each field 243, to identify entries closer to the branch networks than the entry identified in S330 as the closest entry on the common path to the branch networks.

For example, when in the example of FIG. 1 the common path information (the router 6a (R-a), the router 6d (R-d) and the router 6e (R-e)) between the path between the branch network 3a (branch A) and the branch network 3d (branch D) and the path between the branch network 3a (branch A) and the branch network 3e (branch E) is displayed, the router 6f (R-f) and the router 6g (R-g) are identified as devices closer to the branch networks than the router 6e (R-e) closest to the branch networks among the devices constituting the common path.

When the devices outside the common path on the side of the branch networks are identified (S340), the display control part 120 judges whether there is a device whose traffic exceeds a prescribed value (S350).

In detail, first the display control part 120 acquires the device ID and the interface ID of each entry identified in S340.

Then, the display control part 120 refers to the traffic information table 250 having the latest collection time among the traffic information tables 250 whose fields 252 store the same device ID as the acquired device ID. Further, the display control part 120 refers to the traffic information stored in the field 253, to identify an entry that has the same interface ID as the acquired interface ID concerned. Then, the input traffic of the identified entry is acquired.

Then, the display control part 120 judges whether each acquired input traffic exceeds a prescribed threshold or not. Here, the prescribed threshold is a value indicating traffic that leads to router's transfer performance deterioration, network performance deterioration, or the like, for example. This value can be previously set by a user such as the network administrator. This threshold can be set to a smaller value than the threshold used in S330.

If there is an entry whose input traffic exceeds the prescribed threshold (YES in S350), then the flow proceeds to S360. On the other hand, if it is judged that there is no entry whose input traffic exceeds the prescribed threshold (NO in S350), the processing is ended.

For example, in the case where in the example of FIG. 1, among the path between the branch network 3a (branch A) and the branch network 3d (branch D) and the path between the branch network 3a (branch A) and the branch network 3e (branch E), the former path has a biasedly-larger traffic than the latter path, then the router 6f (R-f) is identified as a router whose input traffic exceeds the prescribed threshold.

When, outside the common path on the side of the branches, there is a device whose traffic exceeds the prescribed value (YES in S350), the display control part 120 displays the path information corresponding to the device in question (S360).

In detail, the display control part 120 displays a screen as shown in FIG. 14. FIG. 14 is a view showing an example where common path information between a destination and a plurality of branches and added path information are displayed.

As shown in the figure, the path display screen 900*c* is similar to the path display screen 900*b* (See FIG. 12). As differences, a piece of path information is added in the path information field 920, and the added path information and the branch information related to the added path information are displayed in an associated manner.

Of course, construction of the path display screen is not limited to the above.

First, the display control part 120 refers to the path information table 240 that includes an entry of the device identified in S350 as one whose input traffic exceeds the prescribed threshold. Then, the display control part 120 displays an entry corresponding to the entry in question in the path information field 920. A method of displaying the entry is similar to that for the path display screen 900*a*.

Further, among the entries displayed in the branch field 930 in S320, the display control part 120 displays the entry corresponding to the branch IP address of the path information table 240 that includes the entry of the device identified in S350 and the entry added to the path information field 920 in such a mode that the correspondence between both entries can be recognized. For example, as shown in the figure, the same color may be used to display those entries. Of course, a mode of display is not limited to this.

In the example of the figure, the common path information (the router 6*a* (R-a), the router 6*d* (R-d), and the router 6*e* (R-e)) between the path between the branch network 3*a* (branch A) and the branch network 3*d* (branch D) and the path between the branch network 3*a* (branch A) and the branch network 3*e* (branch E) in the FIG. 1 is displayed in the path information field 920.

Further, the router 6*f* (R-f) is displayed additionally as a router whose input traffic exceeds the prescribed threshold. Further, the branch information of the branch D and the additionally-displayed path information are displayed in a different mode from other information. By this arrangement, a user can easily specify a path or a device that should be inspected fully.

As described above, path information is displayed in addition to the integrated path information.

The display control part 120 may send the interface ID of the interface whose input traffic exceeds the prescribed threshold, the device Id of the device having the interface in question, the management IP address of the device, and the like to an external network management device. Further, these pieces of information may be outputted into a prescribed file.

Hereinabove, the first embodiment of the present invention has been described. According to the present embodiment, information on communication relations and communication paths to be monitored is automatically generated, and user's load is reduced.

In other words, when a user designates a destination that he desires to be an object of monitoring, then communication relations having the designated destination as their destination are generated as well as their communication paths, and added to objects under monitoring. This reduces work load of the user.

Further, information on the network devices on the generated communication paths are displayed in the connection order of the network devices. Further, traffics of interfaces of each network device are displayed. By this, a user can easily find, for example, a communication path having a larger traffic or a communication path's part having a larger traffic from the monitored network as a whole. Further, the user's work load is reduced.

Further, a common communication path among the generated communication paths is displayed in an integrated manner. This reduces the amount of information displayed, and a user can more easily find, for example, a communication path having a larger traffic or a communication path's part having a larger traffic. Further, the user's work load is reduced.

Further, when a prescribed condition is satisfied, for example, in the case where traffic on an integratedly-displayed common path is larger than usual, then a communication path assumed to be a cause to meet the condition is displayed. By this, a user can easily find, for example, the cause to increase traffic of the communication path. Further, the user's work load is reduced.

Further, it is possible to display path information on the side of the destination network from a WAN and path information on the side of the branch networks from the WAN as separate pieces of path information. By this, a user can more easily monitor the traffic inputted to the WAN or the traffic outputted from the WAN.

As described above, after a user find a communication path having larger traffic or a communication path's part having larger traffic, the user can make a detailed investigation by using a product such as another network analysis device or a dedicated device.

Hereinabove, the present invention has been described in relation to example embodiments. It is obvious for a person skilled in the art that many substitutes, corrections and variations can be considered. Thus, the above embodiments of the present invention are intended only to exemplify the gist and scope of the present invention, not to limit the invention.

The invention claimed is:

1. A network monitoring method in a network monitoring device that monitors a state of a network having a plurality of terminals and network devices, wherein the network monitoring device comprises a storage part, which stores configuration information that includes interface address information identifying an interface address of a communication interface and a subnet mask length of the interface address, for each of the terminals and the network devices, and transfer destination information held by each of the network devices, including information that associates destination address information which identifies a destination address and a subnet mask length of the destination address with transfer destination address information which identifies a transfer destination address to which the destination address is to be transferred, and a control part for controlling the network monitoring device; and the method performs:
an input receiving step, in which designated destination address information that includes a designated destination address as an object of path information generation and a subnet mask length of the designated destination address is received through an input part;
a path information generation step, which comprises:
a step, in which,
from the transfer destination information of each network devices and for each piece of the destination address information, a network address of the destination address identified from a piece of the destination address information in question is acquired as a first address, then, from the configuration information of each of the terminals, a network address of the interface address identified from the interface address information is acquired as a second address, and then, among the first addresses, each address that coincides with a plurality of the second addresses is identified as a branch network address, and address information that includes an identified branch network address and a subnet mask length of the branch network address is acquired as branch network address information;

a step in which, from the configuration information of each of the network devices, a network address of the interface address identified from the interface address information is acquired as a third address, then, among the third addresses, an address coincident with the branch network address identified from the branch network address information is identified, and then, a network device having the interface address corresponding to the identified address is identified;

a step in which, by sequentially and repeatedly performing:

a first step in which, from the transfer destination information of the identified network device, a transfer destination address to which the designated destination address identified from the designated destination address information should be transferred is acquired, and a second step in which, from the configuration information of each of the network devices, an interface address coincident with the acquired transfer destination address is identified, and a network device having the identified interface address is identified, to use then the transfer destination information of the identified network device in the first step, path information that includes information specifying connection order of network devices between the branch network and the designated designation address is generated, wherein the generated path information is stored in the storage part, wherein when a plurality of branch network addresses have been identified, path information is generated between each of the branch network addresses and the designated destination address;

a step in which the control part performs:

a first step of acquiring, from each of the network devices identified from the interface address information included in the configuration information, traffic information indicating a traffic of the network device in question, and stores the acquired traffic information in the storage part, a second step of performing processing in which the path information is acquired from the storage part, and displaying the network devices connection order identified from the path information on a display part, a third stop of processing in which the traffic information of each of the network devices constituting the connection order is acquired from the storage part, and the acquired traffic information is displayed on the display part, a fourth step of identifying, among the generated pieces of path information, pieces of path information having the same designated destination address, comparing the network devices connection orders identified from the identified pieces of path information to identify common connection order common to the compared connection orders, and displaying the identified common connection order on the display part, a fifth step of identifying a first network device that is closest in the connection order to the branch networks among the network devices constituting the identified common connection order, and judging whether a traffic of the first network device exceeds a first threshold, a sixth step of when the traffic is judged to exceed the first threshold, identifying second network devices located between the first network device and the branch networks, from each piece of the path information including the common connection order, a seventh step of identifying a second network device whose traffic exceeds a second threshold among the identified second network devices, and an eighth step of displaying the identified second network device together with the common connection order, wherein the transfer destination information includes output interface information that identifies an output interface coupled to the transfer destination address;

a step of identifying the output interface together with the transfer destination address to which the designated destination address is to be transferred, and generates path information that includes information specifying the network devices connection order together with the output interface of each of the network devices; and a step in which the control part further performs:

a step of acquiring, from the storage part, the traffic information of the output interface of a network device as a component of the connection order, and displaying the acquired traffic information in the display part.

2. A non-transitory storage medium having stored thereon a program for making a computer function as a network monitoring device that monitors a state of a network having a plurality of terminals and network devices, wherein the program, when executed, makes the computer function as:

a storage part, which stores configuration information that includes interface address information identifying an interface address of a communication interface and a subnet mask length of the interface address, for each of the terminals and the network devices, and transfer destination information held by each of the network devices, including information that associates destination address information which identifies a destination address and a subnet mask length of the destination address with transfer destination address information which identifies a transfer destination address to which the destination address is to be transferred; and a control part for controlling the network monitoring device, wherein the control part performs the steps of:

receiving, through an input part, designated destination address information that includes a designated destination address as an object of path information generation and a subnet mask length of the designated destination address, processing in which, from the transfer information of each network devices and for each piece of the destination address information, a network address of the destination address identified from a piece of the destination address information is acquired as a first address, then, from the configuration information of each of the terminals, a network address of the interface address identified from the interface address information is acquired as a second address, then, among the first addresses, each address that coincides with a plurality of the second addresses is identified as a branch network address, and address information that includes an identified branch network address and a subnet mask length of the branch network address is acquired as branch network address information, processing in which, from the configuration information of each of the network devices, a network address of the interface address identified from the interface address information is acquired as a third address, then, among the third addresses, an address coincident with the branch network address identified from the branch network address information is identified, then, a network device having the interface address corresponding to the identified address is identified, and processing in which, by sequentially and repeatedly performing:

first processing in which, from the transfer destination information of the identified network device, a transfer destination address to which the designated destination address identified from the designated destination address information should be transferred is acquired, and second processing in which, from the configuration information of each of the network devices, an interface address coincident with the acquired transfer destination address is identified, and a network device having the identified interface address is identified, to use then the transfer destination information of the identified network device in the first processing, path information that includes information specifying connection order of network devices between a branch network and the designated designation address is generated, storing the generated path information in the storage part, wherein when a plurality of branch network addresses have been identified, the path information generation part generates the path information between each of the branch network addresses and the designated destination address, wherein the control part further performs the steps of:

a first step of acquiring, from each of the network devices identified from the interface address information included in the configuration information, traffic information indicating a traffic of the network device in question, and stores the acquired traffic information in the storage part, a second step of performing processing in which the path information is acquired from the storage part, and displaying the network devices connection order identified from the path information on a display part, a third stop of processing in which the traffic information of each of the network devices constituting the connection order is acquired from the storage part, and the acquired traffic information is displayed on the display part, a fourth step of identifying, among the generated pieces of path information, pieces of path information having the same designated destination address, comparing the network devices connection orders identified from the identified pieces of path information to identify common connection order common to the compared connection orders, and displaying the identified common connection order on the display part, a fifth step of identifying a first network device that is closest in the connection order to the branch networks among the network devices constituting the identified common connection order, and judging whether a traffic of the first network device exceeds a first threshold, a sixth step of when the traffic is judged to exceed the first threshold, identifying second network devices located between the first network device and the branch networks, from each piece of the path information including the common connection order, a seventh step of identifying a second network device whose traffic exceeds a second threshold among the identified second network devices, and an eighth step of displaying the identified second network device together with the common connection order, wherein the transfer destination information includes output interface information that identifies an output interface coupled to the transfer destination address;

a step of identifying the output interface together with the transfer destination address to which the designated destination address is to be transferred, and generates path information that includes information specifying the network devices connection order together with the output interface of each of the network devices; and a step in which the control part further performs:

a step of acquiring, from the storage part, the traffic information of the output interface of a network device as a component of the connection order, and displaying the acquired traffic information in the display part.

* * * * *

UNITED STATES PATENT AND TRADEMARK OFFICE
CERTIFICATE OF CORRECTION

| | | |
|---|---|---|
| PATENT NO. | : 8,203,962 B2 | Page 1 of 1 |
| APPLICATION NO. | : 12/486419 | |
| DATED | : June 19, 2012 | |
| INVENTOR(S) | : J. Kitawaki et al. | |

It is certified that error appears in the above-identified patent and that said Letters Patent is hereby corrected as shown below:

Title Page, Item (74) Attorney, Agent, or Firm should read -- BRUNDIDGE & STANGER, P..C. --

Signed and Sealed this
Fourteenth Day of August, 2012

David J. Kappos
*Director of the United States Patent and Trademark Office*